United States Patent
Hirano et al.

(10) Patent No.: US 7,405,896 B2
(45) Date of Patent: Jul. 29, 2008

(54) METHOD AND APPARATUS FOR DETECTING SLIDER/DISK FLY-HEIGHT MODULATION IN A HARD DISK DRIVE

(75) Inventors: Toshiki Hirano, San Jose, CA (US); Ullal V. Nayak, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/412,594

(22) Filed: Apr. 26, 2006

(65) Prior Publication Data

US 2007/0253090 A1    Nov. 1, 2007

(51) Int. Cl.
*G11B 21/02* (2006.01)
(52) U.S. Cl. .................. 360/75; 360/77.03
(58) Field of Classification Search ............ None
See application file for complete search history.

(56) References Cited

U.S. PATENT DOCUMENTS

| | | | |
|---|---|---|---|
| 4,931,887 A | 6/1990 | Hedge et al. | |
| 5,136,250 A | 8/1992 | Abdelli | |
| 5,410,439 A * | 4/1995 | Egbert et al. | 360/75 |
| 5,488,519 A * | 1/1996 | Ishida et al. | 360/77.03 |
| 5,825,577 A * | 10/1998 | Miyatake et al. | 360/75 |
| 6,092,412 A * | 7/2000 | Flechsig et al. | 73/105 |
| 6,359,746 B1 * | 3/2002 | Kakekado et al. | 360/75 |
| 6,700,724 B2 | 3/2004 | Riddering et al. | |
| 6,728,050 B2 | 4/2004 | Wilson | |
| 6,757,120 B2 | 6/2004 | Minoshima et al. | |
| 2003/0043497 A1 | 3/2003 | Riddering et al. | |
| 2003/0218813 A1 | 11/2003 | Dakroub | |

FOREIGN PATENT DOCUMENTS

| | | |
|---|---|---|
| JP | 57060566 | 4/1982 |
| JP | 61045907 | 3/1986 |
| JP | 62159385 | 7/1987 |
| JP | 9229610 | 9/1997 |

OTHER PUBLICATIONS

"Capacitance Probe and Constant Q Circuit for Measuring Head Flying Height", *IBM Technical Disclosure Bulletin*, (Jun. 1979), pp. 319-320.

"Dynamic Fly Height Monitor", *IBM Technical Disclosure Bulletin*, (Apr. 1986), pp. 5133-5135.

"Fly Height Monitor Improves Hard Drive Reliability", *WD White Paper* http://www.wdc.com/en/library/2579-850123.pdf, (Apr. 1999), pp. 1-3.

* cited by examiner

*Primary Examiner*—K. Wong

(57) ABSTRACT

A method and apparatus for detecting slider/disk fly-height modulation in a hard disk drive is provided. A slider is electrically isolating from an electrically grounded suspension. A signal line is coupled to the slider, the signal line for providing an alert signal when a modulation in fly-height between the slider and an electrically grounded disk of the hard disk drive occurs.

20 Claims, 6 Drawing Sheets

METHOD AND APPARATUS FOR DETECTING SLIDER/DISK FLY-HEIGHT MODULATION IN A HARD DISK DRIVE

TECHNICAL FIELD

This invention relates to the field of hard disk drives, and provides for improving read-write functionality by monitoring the read-write head interaction with the hard disk via a charge measurement system.

BACKGROUND ART

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 50 years ago and resembles a phonograph. That is, the hard drive model includes a storage disk or hard disk that spins at a standard rotational speed. An actuator arm with a suspended slider is utilized to reach out over the disk. The arm carries a head assembly that has a magnetic read/write transducer or head for reading/writing information to or from a location on the disk. The complete head assembly, e.g., the suspension and head, is called a head gimbal assembly (HGA).

In operation, the hard disk is rotated at a set speed via a spindle motor assembly having a central drive hub. Additionally, there are circumferential tracks evenly spaced at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size. Much of the refinement has been driven by consumer demand for smaller and more portable hard drives such as those used in personal digital assistants (PDAs), MP3 players, and the like. For example, the original hard disk drive had a disk diameter of 24 inches. Modern hard disk drives are much smaller and include disk diameters 3.5 to 1 inches (and even smaller 0.8 inch). Advances in magnetic recording are also primary reasons for the reduction in size.

However, the decreased track spacing and the overall reduction in HDD component size and weight in collusion with the load/unload drive capabilities have resulted in problems with respect to the HGA in general and the slider suspension in particular. Specifically, as the component sizes shrink, a need for tighter aerial density arises. In other words, the HGA is brought physically closer to the magnetic media. In some cases, the HGA will reach "ground zero" or contact recording. However, one of the major problems with near contact recording is the effect of vibration resonance when a slider encounters the asperities of the magnetic media or disk.

For example, when the slider contacts the disk, dynamic coupling between the slider and components of the head gimbal assembly (including the gimbal structure and nose portion) make the interface unstable and generate a strong or even a sustained slider (or even HGA) vibration. The vibration will result in slider flying high for some period of time and than returning to normal fly-height as the vibrations reduce below a threshold. This phenomenon is known as fly-height hysteresis. When slider is flying higher or lower than normal, the read/write performance is degraded. In other words, if the fly-height hysteresis occurs during a data write operation, the data is not written to the disk properly due to the higher than normal head to disk distance, and in the worst case, the data is lost. Similar difficulties arise during a read operation.

Thus there is a need for monitoring the fly-height of a read-write head and for detecting collisions with asperities that could introduce momentary fly-height modulations, and for compensating for them by informing the read-write controller when they have occurred.

SUMMARY

A method and apparatus for detecting slider/disk fly-height modulation in a hard disk drive is provided. A slider is electrically isolating from an electrically grounded suspension. A signal line is coupled to the slider, the signal line for providing an alert signal when a modulation in fly-height between the slider and an electrically grounded disk of the hard disk drive occurs.

BEST MODES FOR CARRYING OUT THE INVENTION

Reference will now be made in detail to the alternative embodiment(s) of the present invention, an apparatus and method for detecting slider/disk fly-height modulation in a hard disk drive. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
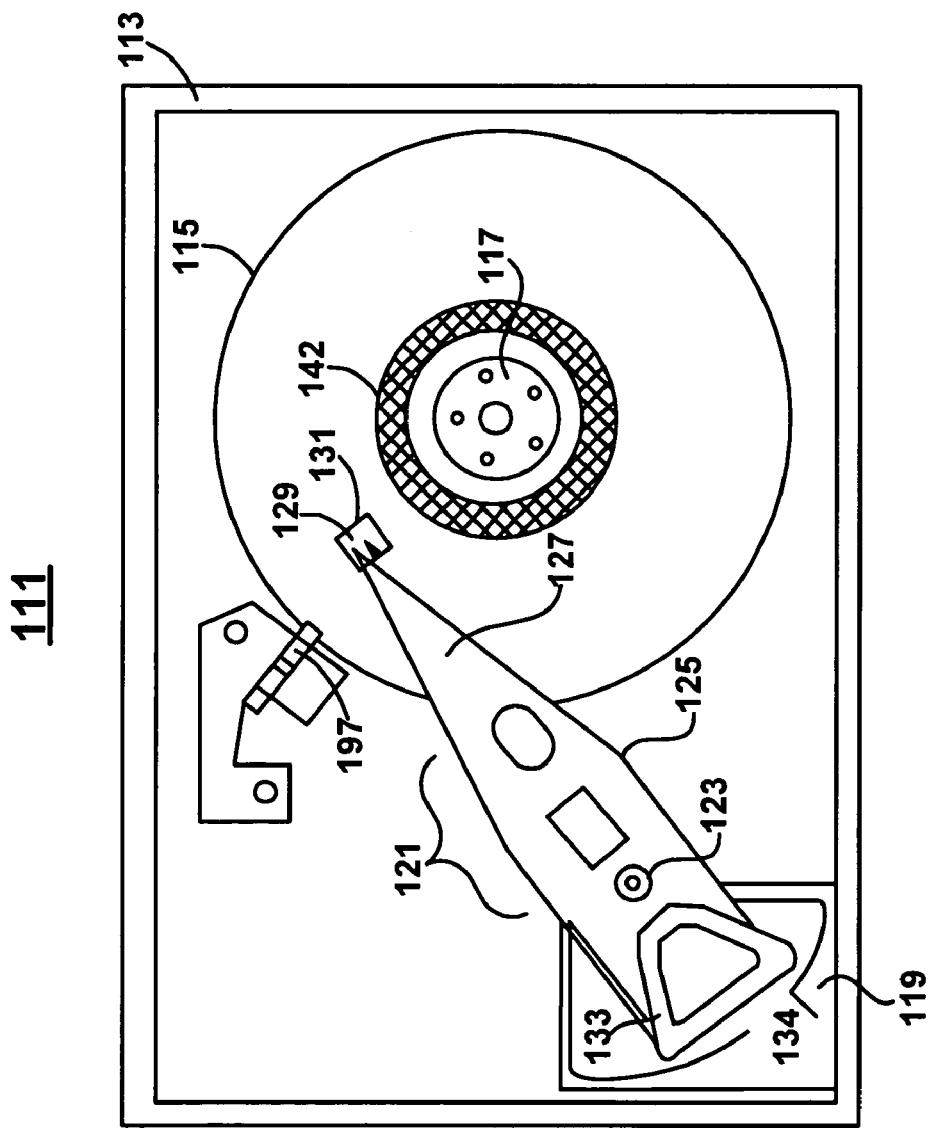
FIG. 1 is a top plan view of a hard disk drive in accordance with one embodiment of the present invention.

With reference now to FIG. 1, a schematic drawing of one embodiment of an information storage system comprising a magnetic hard disk file or drive 111 for a computer system is shown. Although a hard disk drive having a single disk is shown, embodiments of the invention are well suited for utilization on a hard disk drive having a plurality of disks therein. Furthermore, the single disk hard drive of FIG. 1 is merely one version of a plurality of hard disk drive configurations that may be utilized in conjunction with the present invention. For example, in one embodiment the hard disk drive 111 would use load/unload (L/UL) techniques with a ramp 197 and a nose limiter. In another embodiment, the drive 111 is a non L/UL drive, for example, a contact start-stop (CSS) drive having a textured landing zone 142 away from the data region of disk 115.

In the exemplary FIG. 1, Drive 111 has an outer housing or base 113 containing a disk pack having at least one media or magnetic disk 115. A spindle motor assembly having a central drive hub 117 rotates the disk or disks 115. An actuator comb 121 comprises a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to disk 115.

In the embodiment shown, arm 125 has extending from it at least one cantilevered electrical lead suspension (ELS) 127. It should be understood that ELS 127 may be, in one embodiment, an integrated lead suspension (ILS) that is formed by a subtractive process. In another embodiment, ELS 127 may be formed by an additive process, such as a circuit integrated suspension (CIS). In yet another embodiment, ELS 127 may be a flex-on suspension (FOS) attached to base metal or it may be a flex gimbal suspension assembly (FGSA) that is attached to a base metal layer. The ELS may be any form of lead suspension that can be used in a data access storage device, such as a HDD. A magnetic read/write transducer 131 or head is mounted on a slider 129 and secured to a flexible structure called "flexure" that is part of ELS 127. The read/write heads magnetically read data from and/or magnetically write data to disk 115. The level of integration called the head gimbal assembly (HGA) is the head and the slider 129, which are mounted on suspension 127. The slider 129 is usually bonded to the end of ELS 127.

ELS 127 has a spring-like quality, which biases or presses the air-bearing surface of the slider 129 against the disk 115 to cause the slider 129 to fly at a precise distance from the disk as the disk rotates and air bearing develops pressure. The ELS 127 has a hinge area that provides for the spring-like quality, and a flexing interconnect (or flexing interconnect) that supports read and write traces through the hinge area. A voice coil 133, free to move within a conventional voice coil motor magnet assembly 134 (top pole not shown), is also mounted to arms 125 opposite the head gimbal assemblies. Movement of the actuator comb 121 by controller 119 causes the head gimbal assemblies to move along radial arcs across tracks on the disk 115 until the heads settle on their set target tracks. The head gimbal assemblies operate in a conventional manner and always move in unison with one another, unless drive 111 uses multiple independent actuators (not shown) wherein the arms can move independently of one another.

In general, the load/unload drive refers to the operation of the ELS 127 with respect to the operation of the disk drive. That is, when the disk 115 is not rotating, the ELS 127 is unloaded from the disk. For example, when the disk drive is not in operation, the ELS 127 is not located above the disk 115 but is instead located in a holding location on L/UL ramp 197 away from the disk 115 (e.g., unloaded). Then, when the disk drive is operational, the disk(s) are spun up to speed, and the ELS 127 is moved into an operational location above the disk(s) 115 (e.g., loaded). In so doing, the deleterious encounters between the slider and the disk 115 during non-operation of the HDD 111 are greatly reduced. Moreover, due to the movement of the ELS 127 to a secure off-disk location during non-operation, the mechanical ship shock robustness of the HDD is greatly increased.

Figure 2:
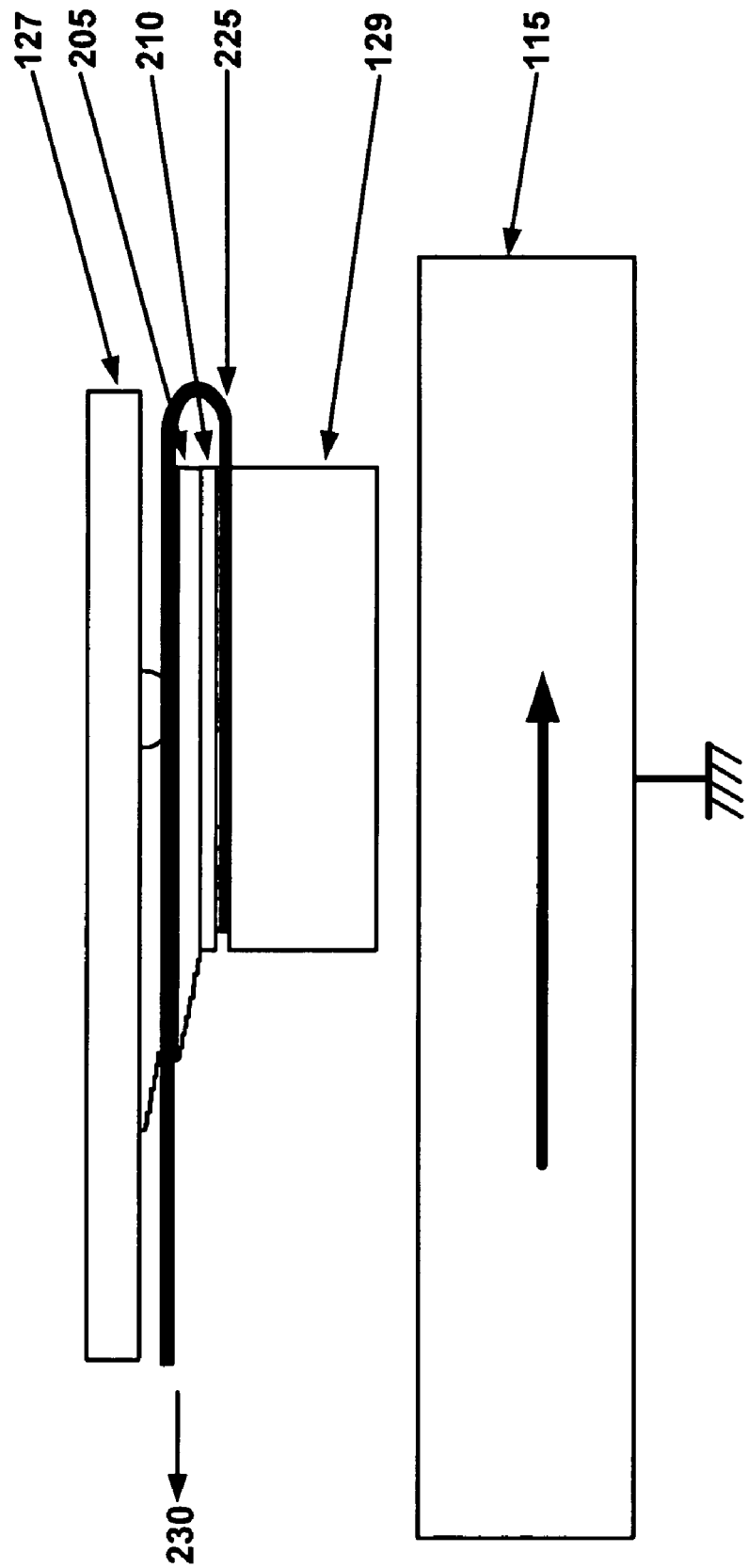
FIG. 2 is an exemplary side view of a head gimbal assembly in accordance with one embodiment of the present invention.

With reference now to FIG. 2, an exemplary side view of a head gimbal assembly (HGA) 200 is shown in accordance with one embodiment of the present invention. In one embodiment, HGA 200 includes the well known structures of the load beam 127, the flexure 205, and the slider 129. However, in HGA 200 unlike the standard HGA structure, the slider 129 is electrically isolated from the flexure 205 by a connecting and insulating bonding agent, typically a polyimide layer 210. Additionally, the slider 129 is electrically coupled to a charge amplifier via a signal line 225. In general, signal line 225 is a copper/gold line which provides an electrical conducting path for a signal 225 which is in turn connected to input to the charge measurement system (e.g., 430 of FIG. 4). These new elements provide a method for isolating the slider 129 from the normal grounding method for a standard HGA 200.

The signal line 225 for connecting the slider 129 to the charge measurement system is shown being coupled to the slider 129. Because of the polyimide layer 210, the slider 129 is no longer connected to the ground system of the HGA 200. This electrical isolation now permits a charge measurement system (such as 430 of FIG. 4) to assess the instantaneous charge state on the slider 129 relative to the grounded hard disk 115.

Figure 3:
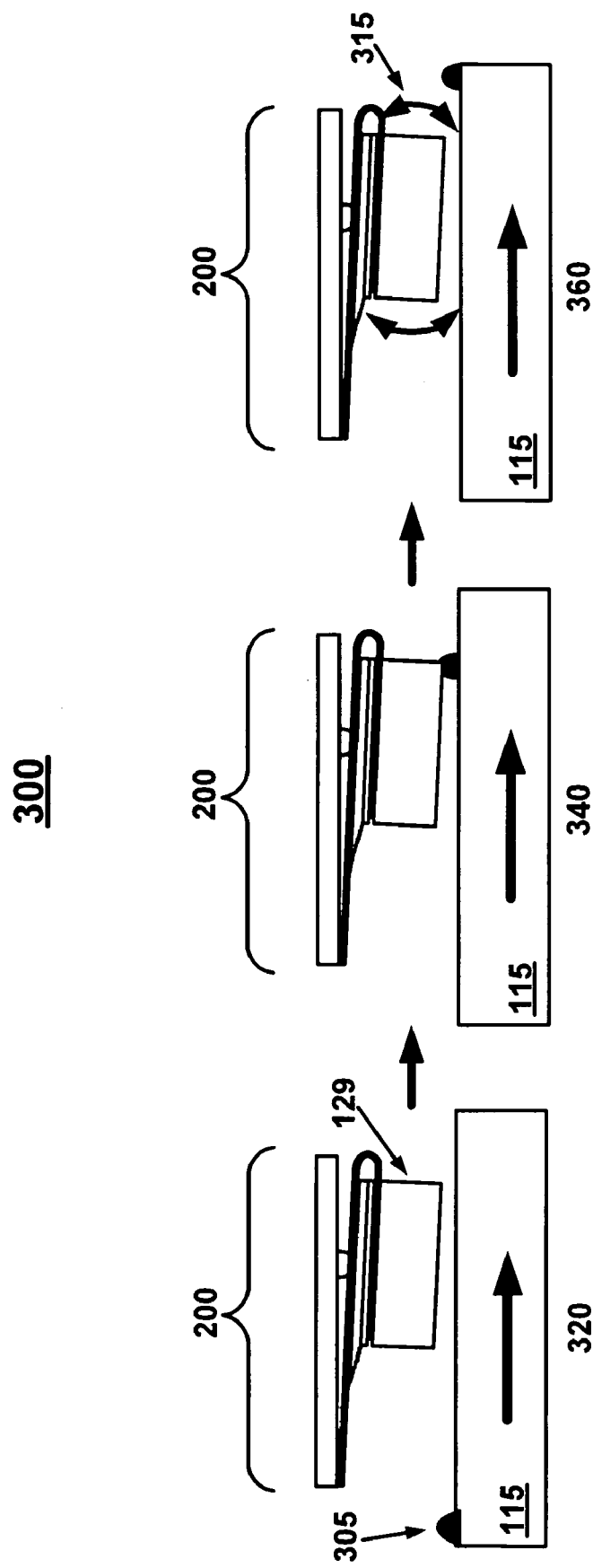
FIG. 3 is a side view of an exemplary head gimbal assembly contacting a disk surface in accordance with one embodiment of the present invention.

Referring now to FIG. 3, a side view of an exemplary head gimbal assembly contacting a disk surface is shown in accordance with one embodiment of the present invention. FIG. 3 provides 3 states of possible HGA 200/disk 115 configurations. Side view 320 illustrates a standard and stable fly-height configuration. However, on the disk 115, an anomaly 305 is shown approaching the HGA 200. Side view 340 illustrates a contact condition when the HGA 200 collides with anomaly 305. That is, side view 340 illustrates the slider 129 in contact with the disk 115 surface. Finally, side view 360 illustrates a post impact HGA 200 when the slider 129 is modulating in relation to the disk surface 115.

Figure 4:
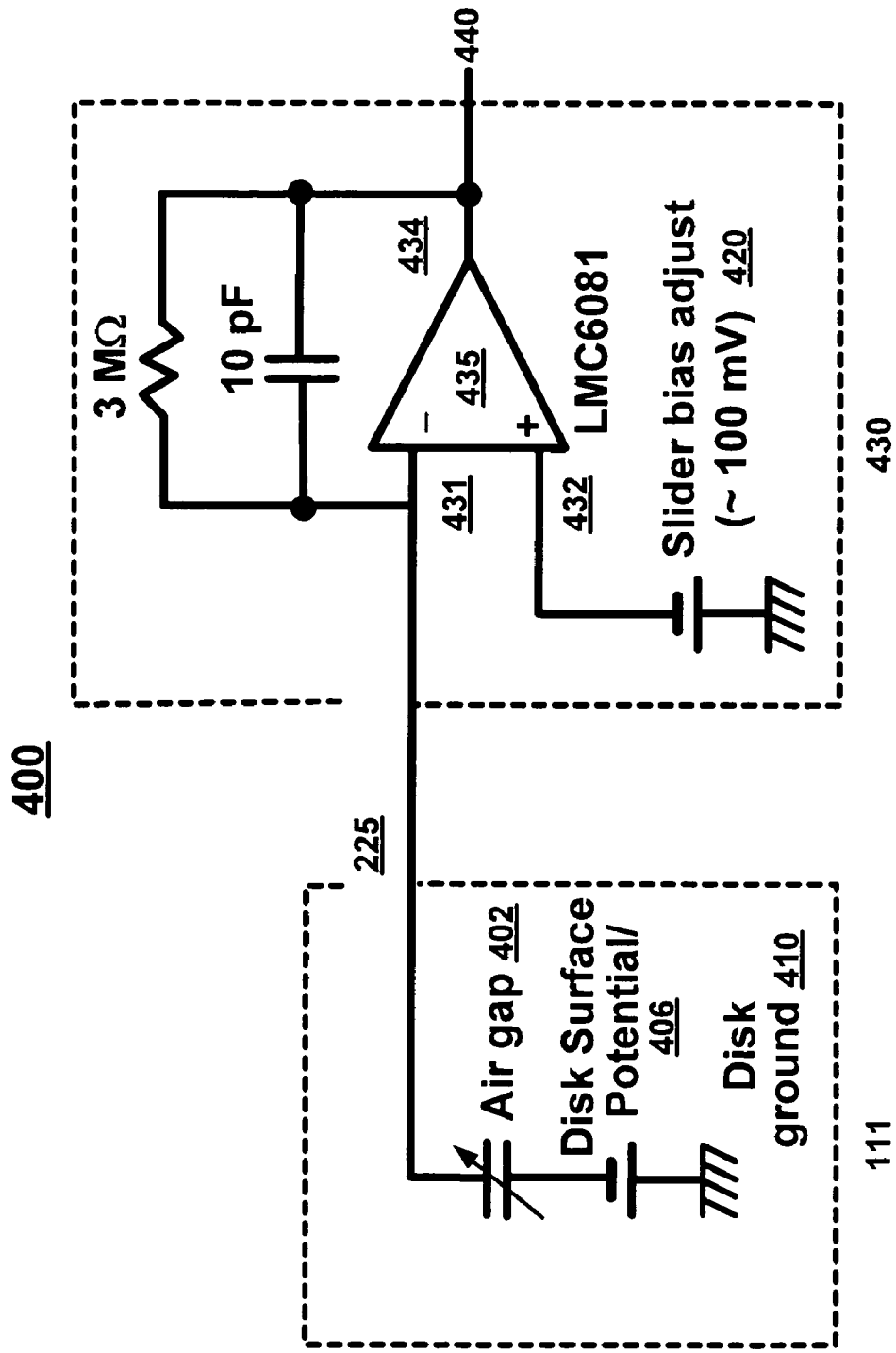
FIG. 4 is a schematic of an exemplary charge amplifier with voltage bias circuit in accordance with one embodiment of the present invention.

With reference now to FIG. 4, a schematic of an exemplary charge amplifier with voltage bias circuit is shown in accordance with one embodiment of the present invention. In general, the charge measurement system 400 is configured to constantly monitor the state of electrical charge on the HDD 111 and detect slider 129 modulating behavior, such as disk 115/slider 129 contacts. System 400 includes a HDD 111 portion and a charge amplifier 430. HDD 111 includes a disk ground 410, a disk surface potential 406 and an air gap (e.g., fly-height) 402. The sensor signal 225 (generated when the slider 129 contacts the disk 115 is output from the HDD 111 and received at the charge amplifier 430. The charge amplifier 430 includes a bias voltage 420.

With reference still to FIG. 4 and to FIG. 3, in one embodiment the HGA 200 and disk 115 form an air gap 402 between the slider 129 and the disk 115. In general, the air gap 402 is the slider 129 fly height. In one embodiment, the disk 115 acquires a charge relative to ground 410 in virtue of its spinning, and this charge creates a disk surface potential 406, relative to the disk ground 410. This charge is transferred when the slider 129 contacts the disk 115 such as shown in 340 of FIG. 3. When contact occurs, a direct current (DC) voltage is realized at the slider 129. The wire signal line 225 attached to the slider 129, as shown in FIG. 2, is connected to the negative input 431 of an operational amplifier 435, referred to as an "op amp." A feedback network is connected from the op amp 435 output terminal 434 to the inverting input terminal 431 in a conventional manner well-known in the op amp arts. With the feedback network in place, the operational amplifier has the well-known characteristic of maintaining a voltage at the inverting input 431 which is the same as at the non-inverting input 432.

In a preferred embodiment, a small DC bias voltage is applied to the non-inverting input 432 via a voltage source 420, derived from a DC power supply. This small bias is typically less than 0.3 volts, and in another preferred embodiment, is set to about 0.1 volt. Through the op amp functionality, this bias voltage 420 is held constant regardless of any charge change in the slider 129 due to fly height modulation or any collisions with the disk 115 or any asperities 305 thereon. The slider 129 is virtually connected to a low-impedance, low voltage DC voltage source. Thus the slider does not build up a high voltage due to changes in charge state. Further, since the slider 129 is electrically isolated from the ELS 127, this bias does not create any interactions with the slider's read and write functionality. Thus, there are no problems with electrostatic discharge from the write head to the disk, and no corrosion occurs due to the potential difference between slider 129 and hard disk 115.

In an alternate embodiment, no op amp is used, but instead the signal line 225 of FIG. 2 or 3 is connected directly to a voltmeter for direct measurement. This method exhibits more noise and does not result in as accurate estimates of slider 129 charge state changes.

The changes in charge state on the slider may be detected from the changes in voltage on the signal line 225 in FIG. 2. The events causing these changes consist of the variation in fly height caused by mechanical effects or a collision with an asperity, such as a dust mote or other microscopic particle, as shown pictorially in 340 of FIG. 3. For example, when the contact between the slider 129 and the disk 115 is conductive, then current flows to the slider 129 from the disk 115, changing the voltage on the slider 129 body. The charge change defined as DeltaQ is equal to V/R*dt, where DeltaQ is the observed charge exchange, V is the potential difference between disk surface and the slider, and dt is the duration of the collision, or contact.

The observed charge change is given by:

$Delta Q = Delta C * V$ where

V is the potential difference between disk surface and slider.

$Delta C = C1 - C0$ where

C1=capacitance between slider and the disk during contact
C0=capacitance between slider and disk during normal fly state Further, $C1 = e1 * A/g1$ where e1=permittivity of the asperity
A=the area of the contact surface
g1=the gap distance between slider and disk during contact.

Further, $C0 = e0 * A/g0$, where e0=permittivity of air (1)
A=area of the contact surface g0=the normal fly height
Thus DeltaQ is given by:

DeltaQ={(e1*A/g1)−(e0*A/g0)}*V, which is not zero and therefore observable by the op amp system or a voltmeter.

Similarly, as the fly height is changing, charge state may be observed again by the change in apparent capacitance. The change in charge is given by:

$Delta Q = Delta C * V$ $Delta C = C1 - C0$, where

C1=capacitance between slider and disk when slider is flying at an abnormal height
C0=capacitance between slider and disk when slider is flying at a normal state
C1=e0*A/g1, where these variables are defined as above.
C0=e0*A/g0, where these variable are defined as above.
Thus,
DeltaQ=e0*A*(1/g1−1/g0)*V. For g1 not equal to g0, a change in charge state DeltaQ will occur.

These changes are output 440 and provide indication of an unacceptable slider 129 event. In one embodiment, the output 440 is provided to a monitor that is configured to recognize when a read or a write event is taking place. If an unacceptable slider event occurs at the same time that a read or write event is occurring, then the monitor conveys a signal indicating that the read or write event should be checked for veracity. If the instant read or write event is found to be correct, then no further action is taken. However, if the read or write event is found to be incorrect, then the read or write event is repeated. Thus, by monitoring the slider 129 voltage, read or write event data loss due to disk/slider contact is significantly reduced. That is, since the read or write event is monitored for disk/slider contact, if disk/slider contact occurs, the read or write event is quickly verified for correctness.

Figure 5:
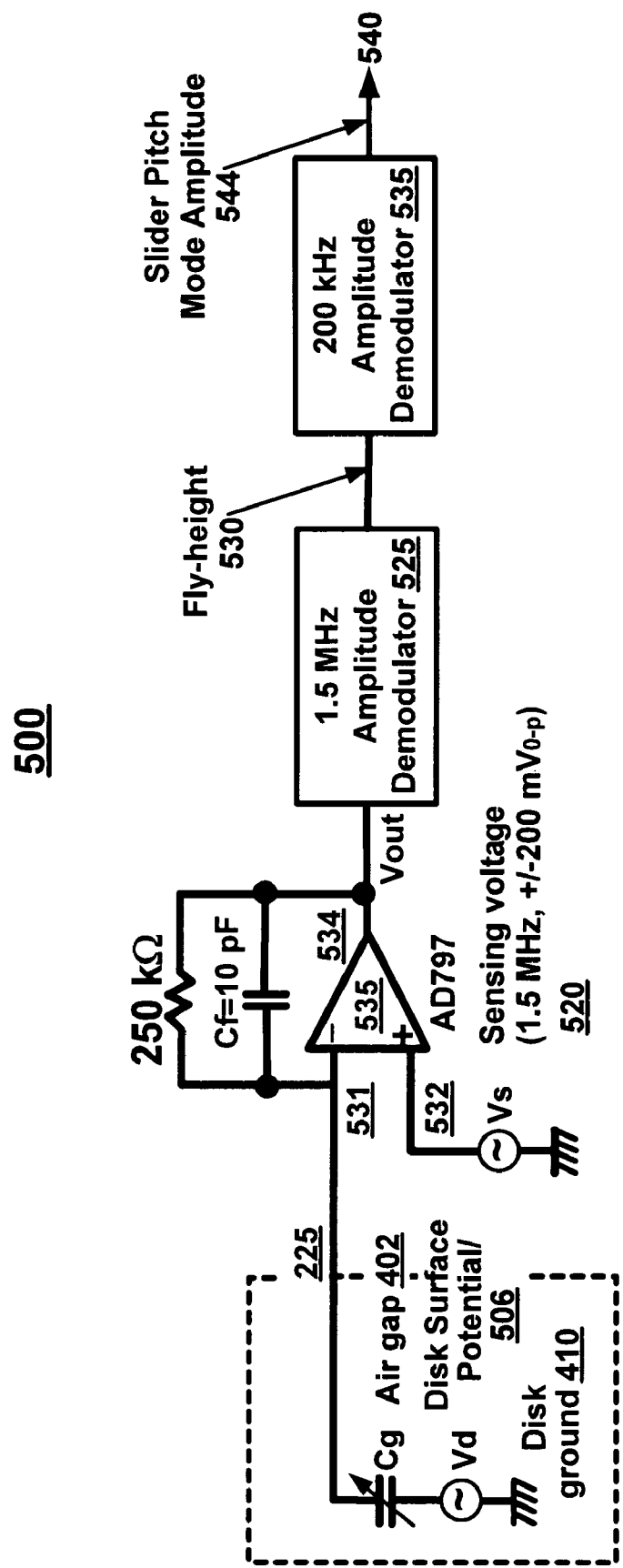
FIG. 5 is a schematic of an exemplary fly-height capacitance sensing circuit in accordance with one embodiment of the present invention.

Referring now to FIG. 5, a schematic of an exemplary fly-height capacitance sensing circuit 500 is shown in accordance with one embodiment of the present invention. Similarly to FIG. 4, the head gimbal assembly (HGA) and hard disk and spindle shown on HDD 111 form an air gap 402 between the slider 129 and the hard disk 115. The gap spacing is given by the fly-height of the slider 129, and forms a capacitor for holding a charge, as depicted at 402. In general, the slider 129 forms one side of the capacitor and the hard disk 115 forms the other. The capacitance is variable, as indicated by the arrow symbol. The disk itself acquires a charge relative to ground in virtue of its spinning, and this charge creates a disk surface potential 506, relative to the disk ground 410. This charge is transferred via the capacitance, creating a varying voltage level on the slider 129 as shown by the AC signal symbol 506. The wire signal line 225 attached to the slider 129, as shown in FIG. 2, is connected to the negative input 531 of an operational amplifier 535, referred to as an "op amp." A feedback network is connected from the op amp 535 output terminal 534 to the inverting input terminal 531 in a conventional manner well-known in the op amp arts. With the feedback network in place, the operational amplifier has the well-known characteristic of maintaining a voltage at the inverting input 531 which is the same as at the non-inverting input 532

In a preferred embodiment, a small AC sensing voltage is applied to the non-inverting input 532 via a voltage source 520, derived from a suitable oscillator. This oscillator source 520 can be realized with off-the-shelf integrated circuits. In a preferred embodiment, the frequency is set to 1.5 MHz. In another preferred embodiment, the operating frequency is chosen to be above the fundamental frequency of the disk surface potential/disk charge-up voltage. The voltage level is typically less than 0.3 volts, and in another preferred embodiment, is set to about 0.2 volt peak or 0.14 volt rms.

In one embodiment, the choice of sensing signal frequency is high enough so that the disk 115 surface charge does not have any signal power at that frequency. In another embodiment, it is also low enough so that the signal can be filtered from the interference from the write current delivered to the write head of the slider 129, which often contains higher frequency components. Additionally, in yet another embodiment, the sensing voltage level should be high enough so that good signal quality is obtained, but low enough so that it does not cause any arcing or other detrimental breakdown between the slider 129 and the disk 115.

In so doing, changes in fly-height or changes in charge level due to collisions with asperities which cause a change in capacitance can now be monitored. For example, the capacitance change alters the AC impedance between the sensor input at 531 and the ground for the sensing voltage source 520 and its voltage level at 532. This change in impedance causes a change in the sensor signal. The op amp 535 amplifies this signal. The signal is then passed on to an amplitude demodulator 525 for conversion back into a DC signal 315. This amplitude demodulator comprises a filter with a narrow band pass centered at the sensing signal frequency and a detector for converting AC into DC. In one embodiment, the sensing signal frequency is 1.5 MHz to detect slider 129 fly height. This DC signal is then passed to a second amplitude demodulator 535 utilizing a sensing signal frequency of 200 kHz to detect the slider pitch mode amplitude 544. The signal 540 is then analyzed to determine if a sufficiently large change in capacitance has occurred, indicating an undesirable slider modulation event.

Further, since the read and write heads of the slider 129 are electrically isolated from the HGA 200, this bias does not create any interactions with their read and write functionality. Thus, there are no problems with electrostatic discharge from the slider 129 to the disk 115, and no corrosion occurs due to the potential difference between slider 129 and disk 115.

The changes in capacitance on the slider may be detected from the changes in AC sensing voltage on the signal line 225 of FIG. 2. The events causing these changes consist of the variation in fly height caused by mechanical effects or a collision with an asperity, such as a dust mote or other microscopic particle, as shown pictorially in FIG. 3. That is, 320 depicts the normal fly height where there is no modulation and no collision, 340 depicts a collision between the slider 129 and the disk 115, and 360 depicts the post disk/slider contact slider 129 modulation. Although, the slider modulation 360 is shown as post collision, the slider modulation 360 may be caused from a plurality of events and is capable of being recognized regardless of whether a disk/slider contact occurred or not. The use of post collision is merely for purposes of brevity and clarity. In general, the slider 129 collision with the disk 115 may be a non-conducting collision, or may be a conductive collision.

If the slider 129 disk 115 collision is conductive, then current flows to the slider 129 from the disk 115, changing the voltage at the slider 129. The charge change defined as DeltaQ is equal to Vd/R*dt, where DeltaQ is the observed charge exchange, Vd is the potential difference between disk 115 surface and the slider 129, and dt is the duration of the collision, or contact. When the disk ground is imperfect, Vd is an AC signal as shown at 506. The increased conductivity means that the instant AC impedance is reduced, resulting in a sudden drop in sensing voltage at 431.

When the asperity is non-conducting, such as with a particle of lubricant, there will be a change in the apparent capacitance, since most asperity materials have a permittivity of greater than 1 (free space or air.)

In one embodiment, the op amp feedback circuit 500 is configured for good stability by use of a 250 Kilo Ohm resistor. The feedback capacitor Cf is chosen to be 10 Pico farads. The op amp has a large open-loop gain the sensing voltage frequency of 1.5 MHz. The feedback resistor's resistance is negligible compared to the impedance of the feedback capacitor at 1.5 MHz. That is, the capacitor's impedance is higher than the resistor value. Under these conditions, the output from the op amp Vout at 534 is given by:

$Vout = (1 + Cg/Cf) * Vs - (Cg/Cf) Vd$ where

Cg is the capacitance of the disk/slider air gap
Cf is the capacitance of the feedback capacitor
Vs is the sensing voltage
Vd is the disk charge-up voltage.

In general, the disk charge-up voltage does not contain very many high frequency components. Its frequency bandwidth is mostly related to the disk rotation frequency. Therefore Vd is negligible at the sensing voltage frequency of 1.5 MHz, so Vd~0. In this case, Vout=(1+Cg/Cf)*Vs Thus changes in Vout indicate changes in slider/disk capacitance, thus indicating the likelihood of an unacceptable slider/disk interaction.

The expected capacitance between the slider and the disk is given by:

$C0 = e0 * A/g0$ where

Co is the capacitance between the slider and the disk at a normal flying state
e0 is the permittivity of air
A is the area
g0 is the normal fly height.

The change in capacitance from a normal state DeltaC is given by:

$DeltaC = C1 - C0$ where

C1=capacitance between the slider and the disk for abnormal fly height
C0=capacitance between slider and disk for normal fly height and $C1 = e0 * A/g1$ where e0 is the permittivity of air
A is the area of the slider body
g1 is the gap between slider and disk while in an abnormal fly height $C0 = e0 * A/g0$ where e0 is the permittivity of air
A is the area of the slider body
g0 is the gap for normal fly height
Thus $DeltaC = e0 * A * (1/g1 - 1/g0)$.

For g0 not equal to zero, there is a non-zero DeltaC to observe.

For the case of a conducting asperity or a direct contact between slider and disk, g1 becomes zero, so again there is a change in apparent capacity which is observable by the capacitance measurement system. When the asperity is non-conducting, the permittivity e0 changes, and usually increases. This also results in a change in capacitance, which is detectable.

These small changes are examined by a comparator and rendered into indication of an unacceptable slider 129 event, at the output of the first demodulator 525. The output from the first demodulator 525 is conveyed to a second demodulator 535 and then output as a signal 540. A Capacitance Event Comparator configured to receive the signal 540 as well as a signal from the hard disk drive controller 202 indicating a read or a write event is taking place. If an unacceptable slider 129 event occurs, signified by signal 540, at the same time then the comparator conveys a signal to the read/write controller allowing the controller to check the read or write event for veracity. If the instant read or write event is found to be correct, then no further action is taken. If it is found to be incorrect, then the controller repeats the read or write event.

Figure 6:
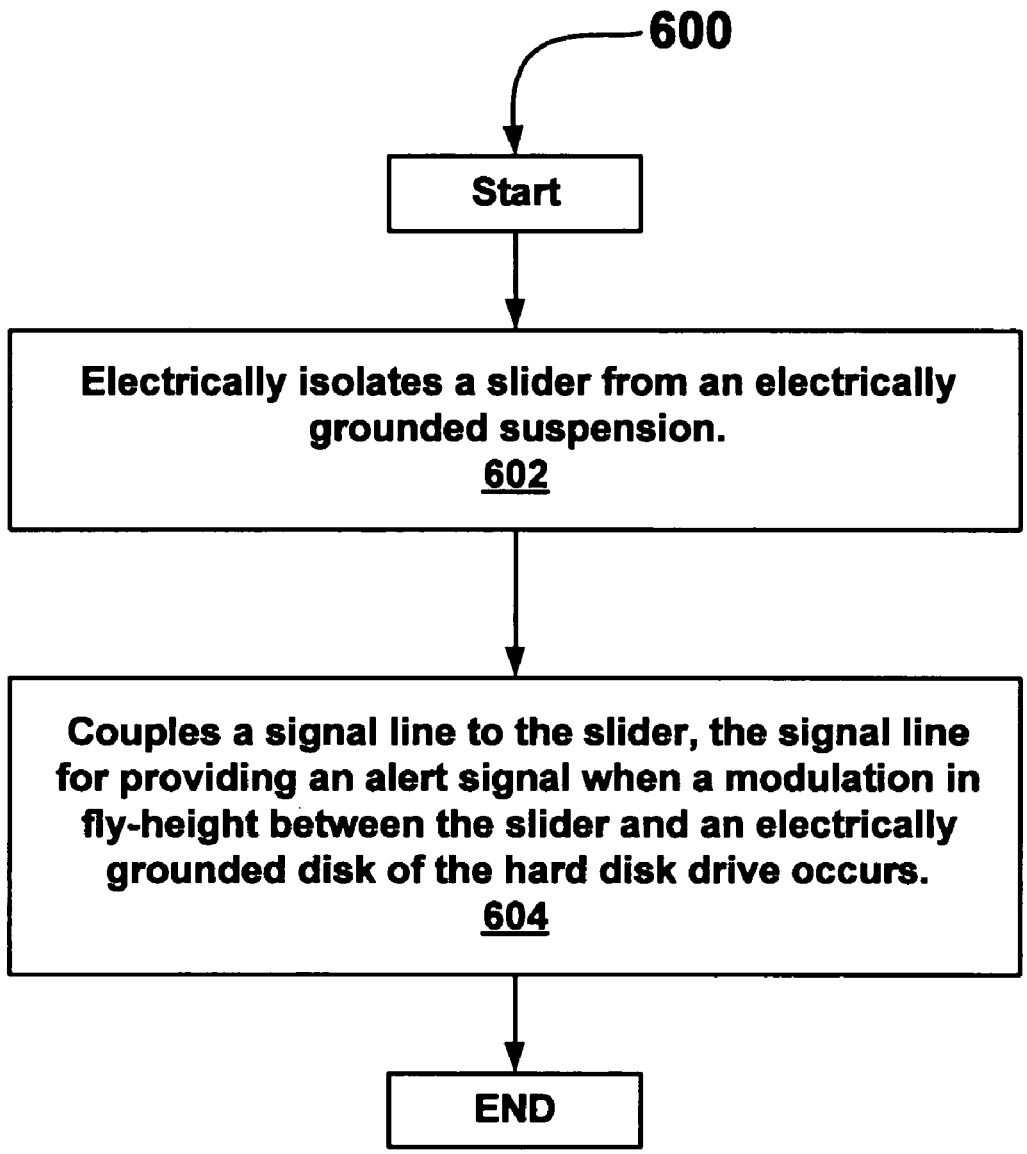
FIG. 6 is a flowchart of a method for increasing the buffer volume in a fluid dynamic bearing in accordance with one embodiment of the present invention.

Referring now to FIG. 6, a flowchart 600 of a method for detecting slider/disk fly-height modulation in a hard disk drive is shown in accordance with one embodiment of the present invention.

With reference now to 602 of FIG. 6 and to FIG. 2, one embodiment electrically isolates a slider 129 from an electrically grounded suspension 127.

Referring now to 604 of FIG. 6 and to FIG. 2, one embodiment couples a signal line to the slider, the signal line for providing an alert signal when a modulation in fly-height between the slider and an electrically grounded disk of the hard disk drive occurs.

In one embodiment, the alert signal is generated on the signal line 225 when the modulation in fly-height between the slider 129 and the disk 115 is results in the slider 129 contacting the disk 115. In general, the slider 129/disk 115 contact is detected by coupling the signal line 225, coupled to the slider 129, with an amplifier 435 of FIG. 4. Then, an operational amplifier feedback 434 is provided to the signal line 225 to maintain the signal line 225 at a constant potential. A small non-zero potential is then maintained on the slider 129 signal line 225, via the amplifier feedback, to obtain stable signal output independent of the disk 115 surface potential. Then, if the slider 129 contacts the disk, the small non-zero potential is exchanged between the slider 129 and the disk 115. In so doing, an alert signal 440 is generated. After an alert signal 440 is generated, the alert signal 440 is filtered at or near a pitch frequency of the slider 129 to increase a signal to noise ratio. In one embodiment, the pitch frequency is approximately 200 kHz.

In another embodiment, the alert signal is generated on the signal line 225 when the modulation in fly-height between the slider and the disk does not result in the slider 129 contacting the disk 115. For example, when the slider fly-height modulates with respect to the disk 115 but the slider 129 does not contact the disk 115. In general, the slider fly-height modulation with respect to the disk is detected by coupling the signal line 225, coupled to the slider 129, with an amplifier 535 of FIG. 5. Then, an operational amplifier feedback 534 is provided to the signal line 225 to maintain the signal line 225 at a constant direct current potential of approximately zero volts. A small alternating current 520 is then provided to the signal line 225. In one embodiment, the small alternating current 520 is provided at a frequency between approximately 1 MHz to 3 MHz and a voltage of approximately +/−0.2V. Then, the capacitance between the slider 129 and the disk 115 is monitored. When the capacitance changes an alert signal is generated. In one embodiment, the alert signal 534 is filtered at a pitch frequency of the slider to increase a signal to noise ratio, wherein the pitch frequency is approximately 200 kHz.

In one embodiment, after an alert signal (e.g., signal 540 or 440) is generated, a determination is made as to whether the modulation in fly-height between the slider 129 and the disk 115 occurred during a read event or a write event. In one embodiment, the determination is made at a read/write controller. In another embodiment, the determination is performed on any device that can monitor both the alert signals (e.g., signals 540 and 440) and the read/write operations. Moreover, if an alert is recognized during a read or write event, a plurality of options exist. The modulation event can be ignored, the read or write event can be instantly repeated with the initial read or write event ignored, or the initial read or write event can be checked for errors. If the read or write event is checked for errors, and errors are found, the read event or the write event is repeated.

Thus, embodiments of the present invention provide a method and apparatus for detecting slider/disk fly-height modulation in a hard disk drive. Moreover, embodiments provide a method and apparatus for detecting slider/disk fly-height modulation in a hard disk drive that further provides real time or near real time fly-height modulation warnings to the read/write controller. Therefore, the read/write controller will be aware of any modulation that occurred during a read/write event. In so doing, the read/write controller will be able to review the read or write and determine if the modulation event caused any errors. If any errors were recognized, the read/write controller will be able to redo the read or write event and therefore overcome fly-height modulation errors.

While the method of the embodiment illustrated in flowchart 600 show specific sequences and quantity of steps, the present invention is suitable to alternative embodiments. For example, not all the steps provided for in the methods are required for the present invention. Furthermore, additional steps can be added to the steps presented in the present embodiment. Likewise, the sequences of steps can be modified depending upon the application.

The alternative embodiment(s) of the present invention, a method and system for improving the read-write functionality of a hard disk drive via read-write head charge exchange between the hard disk and the read-write head is thus described. While the present invention has been described in particular embodiments, it should be appreciated that the present invention should not be construed as limited by such embodiments, but rather construed according to the below claims.

What is claimed is:

1. A method for detecting slider/disk fly-height modulation in a hard disk drive, comprising:

electrically isolating a slider from an electrically grounded suspension;

coupling a signal line to said slider, said signal line for providing an alert signal when a modulation in fly-height between said slider and an electrically grounded disk of said hard disk drive occurs;

spinning said disk wherein said disk acquires a charge relative to ground in virtue of its spinning; and creating a disk surface potential and a voltage on said slider;

wherein changes in a charge state on said slider are detected from changes in said voltage on said signal line, and said alert signal is generated on said signal line.

2. The method of claim 1 wherein said alert signal comprises:

providing said alert signal as a contact alert signal when said modulation in fly-height between said slider and said disk is said slider contacting said disk.

3. The method of claim 2 wherein detecting when said slider contacts said disk comprises:

coupling said signal line coupled to said slider with an amplifier;

providing an operational amplifier feedback to said signal line to maintain said signal line at a constant potential;

maintaining a non-zero potential via said amplifier feedback at said signal line to obtain stable signal output independent of said disk surface potential;

generating said alert signal when said slider contacts said disk and said non-zone potential is exchanged between said slider and said disk; and filtering said alert signal at a pitch frequency of said slider to increase a signal to noise ratio, wherein said pitch frequency is approximately 200 kHz.

4. The method of claim 1 wherein said alert signal comprises:

providing said alert signal as a modulation alert signal when said slider fly-height modulates with respect to said disk.

5. The method of claim 4 wherein detecting when said slider fly-height modulates with respect to said disk comprises:

coupling said signal line coupled to said slider with an amplifier;

providing an operational amplifier feedback to said signal line to maintain said signal line at a constant direct current potential of approximately zero volts;

providing an alternating current to said signal line, said alternating current at a frequency between approximately 1 MHz to 3 MHz and a voltage of approximately +/−0.2V;

monitoring a capacitance between said slider and said disk;

generating said alert signal when said capacitance changes; and filtering said alert signal at a pitch frequency of said slider to increase a signal to noise ratio, wherein said pitch frequency is approximately 200 kHz.

6. The method of claim 1 further comprising:

determining if said modulation in fly-height between said slider and said disk occurs during a read event or a write event.

7. The method of claim 6 further comprising:

repeating said read event or said write event if said modulation in fly-height between said slider and said disk occurs during said read event or said write event.

8. A hard disk drive comprising:

a housing;

at least one disk mounted to said housing, said disk being rotatable relative to said housing, said disk defining an axis of rotation and a radial direction relative to said axis;

an actuator mounted to said housing and being movable relative to said disk, said actuator having a suspension for reaching over said disk, said suspension having an electrically isolated slider coupled therewith, said slider having a read/write head element on a trailing edge (TE) portion of said slider;

a signal line coupled to said electrically isolated slider, said signal line for providing an alert signal when a modulation in fly-height occurs between said slider and said disk; and a spindle motor assembly for spinning said disk wherein said disk acquires a charge relative to around in virtue of its spinning and creates a disk surface potential and a voltage on said slider;

wherein changes in a charge state on said slider are detected from changes in said voltage on said signal line, and said alert signal is generated on said signal line.

9. The hard disk drive of claim 8 wherein said alert signal on said signal line is generated when said modulation in fly-height between said slider and said disk is said slider contacting said disk.

10. The hard disk drive of claim 9 wherein detecting when said slider contacts said disk comprises:

an amplifier coupled to said signal line;

an operational amplifier feedback provided to said signal line from said amplifier, said operational amplifier feedback for maintaining said signal line at a constant potential;

a non-zero potential provided to said signal line via said amplifier feedback to obtain stable signal output independent of said disk surface potential;

an alert signal generator for generating said alert signal when said slider contacts said disk and said non-zero potential is exchanged between said slider and said disk; and a filter for filtering said alert signal at a pitch frequency of said slider to increase a signal to noise ratio, wherein said pitch frequency is approximately 200 kHz.

11. The hard disk drive of claim 8 wherein said alert signal on said signal line is generated when said slider fly-height modulates with respect to said disk.

12. The hard disk drive of claim 11 wherein detecting when said slider fly-height modulates with respect to said disk comprises:

an amplifier coupled to said signal line;

an operational amplifier feedback provided to said signal line from said amplifier, said operational amplifier feedback for maintaining said signal line at a constant direct current potential of approximately zero volts;

an alternating current provided to said signal line, said alternating current at a frequency between approximately 1 MHz to 3 MHz and a voltage of approximately +/−0.2V;

a capacitance monitor for monitoring a capacitance between said slider and said disk;

an alert signal generator for generating said alert signal when said capacitance between said slider and said disk changes; and a filter for filtering said alert signal at a pitch frequency of said slider to increase a signal to noise ratio, wherein said pitch frequency is approximately 200 kHz.

13. The hard disk drive of claim 8 wherein said modulation in fly-height between said slider and said disk is monitored to recognize if said modulation occurs during a read event or a write event.

14. The hard disk drive of claim 13 wherein said read event or said write event is repeated if said modulation in fly-height between said slider and said disk occurs during said read event or said write event.

15. A slider/disk fly-height modulation detector comprising:

a suspension having an electrically isolated slider coupled therewith, said slider having a read/write head element on a trailing edge (TE) portion of said slider; and a signal line coupled to said electrically isolated slider, said signal line for providing an alert signal when a modulation in fly-height occurs between said slider and a disk;

wherein said disk acquires a charge relative to around in virtue of its spinning and creates a disk surface potential and a voltage on said slider; and wherein changes in a charge state on said slider are detected from changes in said voltage on said signal line, and said alert signal is generated on said signal line.

16. The slider/disk fly-height modulation detector of claim 15 wherein said alert signal on said signal line is generated when said modulation in fly-height between said slider and said disk is said slider contacting said disk.

17. The slider/disk fly-height modulation detector of claim 16 wherein detecting when said slider contacts said disk comprises:
- an amplifier coupled to said signal line;
- an operational amplifier feedback provided to said signal line from said amplifier, said operational amplifier feedback for maintaining said signal line at a constant potential;
- a non-zero potential provided to said signal line via said amplifier feedback to obtain stable signal output independent of said disk surface potential;
- an alert signal generator for generating said alert signal when said slider contacts said disk and said non-zero potential is exchanged between said slider and said disk; and
- a filter for filtering said alert signal at a pitch frequency of said slider to increase a signal to noise ratio, wherein said pitch frequency is approximately 200 kHz.

18. The slider/disk fly-height modulation detector of claim 15 wherein said alert signal on said signal line is generated when said slider fly-height modulates with respect to said disk.

19. The slider/disk fly-height modulation detector of claim 18 wherein detecting when said slider fly-height modulates with respect to said disk comprises:
- an amplifier coupled to said signal line;
- an operational amplifier feedback provided to said signal line from said amplifier, said operational amplifier feedback for maintaining said signal line at a constant direct current potential of approximately zero volts;
- an alternating current provided to said signal line, said alternating current at a frequency between approximately 1 MHz to 3 MHz and a voltage of approximately +/−0.2V;
- a capacitance monitor for monitoring a capacitance between said slider and said disk;
- an alert signal generator for generating said alert signal when said capacitance between said slider and said disk changes; and
- a filter for filtering said alert signal at a pitch frequency of said slider to increase a signal to noise ratio, wherein said pitch frequency is approximately 200 kHz.

20. A method for detecting slider/disk fly-height modulation in a hard disk drive, comprising:
- means for electrically isolating a slider from an electrically grounded suspension;
- means for coupling a signal line to said slider;
- means for electrically grounding a disk in said hard disk drive;
- means for generating an alert signal on said signal line when a modulation in fly-height between said slider and said disk occurs;
- means for spinning said disk wherein said disk acquires a charge relative to ground in virtue of its spinning; and
- means for creating a disk surface potential and a voltage on said slider;
- wherein changes in a charge state on said slider are detected from changes in said voltage on said signal line, and said alert signal is generated on said signal line.

* * * * *